United States Patent [19]

Hildinger

[11] 4,130,884

[45] Dec. 19, 1978

[54] TEXT PROCESSING ARRANGEMENT

[75] Inventor: Eugen Hildinger, Soecking, Germany

[73] Assignee: Siemens Aktiengesellschaft, Berlin & Munich, Germany

[21] Appl. No.: 705,829

[22] Filed: Jul. 16, 1976

[30] Foreign Application Priority Data

Aug. 22, 1975 [DE] Fed. Rep. of Germany ....... 2537576

[51] Int. Cl.$^2$ ........................ G06F 3/10; G06F 13/00; G02B 5/14; B41J 29/42

[52] U.S. Cl. ................................ 364/900; 350/96.24; 400/63; 400/74; 400/711

[58] Field of Search ............................ 340/172 S, 380; 350/96 R, 96 B, 28 S, 321; 197/19, 20, 188, 187, 189, 190, 176, 82, 84 R, 84 A, 84 B; 35/6; 353/42

[56] References Cited

U.S. PATENT DOCUMENTS

| | | | |
|---|---|---|---|
| 3,501,746 | 3/1970 | Vosbury | 340/172 S |
| 3,505,665 | 4/1970 | Lasoff | 340/172 S |
| 3,610,902 | 10/1971 | Rahenkamp | 340/172 S |
| 3,618,032 | 11/1971 | Goldsberry | 340/172 S |
| 3,786,429 | 1/1974 | Goldman | 340/172 S |
| 3,810,107 | 5/1974 | Goldman | 340/172 S |

*Primary Examiner*—James D. Thomas
*Attorney, Agent, or Firm*—Hill, Gross, Simpson, Van Santen, Steadman, Chiara & Simpson

[57] ABSTRACT

A text processing arrangement employing a typewriter in conjunction with storage means, in which information supplied from a typewriter keyboard is recorded on a page and simultaneously stored in the storage means, and in the event corrections thereof are required, material which to be unchanged is read-out of storage for simultaneous re-recording and further storage, along with change information supplied by the keyboard, and simultaneously recorded and stored in association with such further stored unchanged information, means being provided for following the progress of the re-recording and indicating the corresponding instant read-out position on the initially recorded page.

8 Claims, 6 Drawing Figures

TEXT PROCESSING ARRANGEMENT

BACKGROUND OF THE INVENTION

The invention relates generally to a text processing arrangement utilizing a typewriter in conjunction with storage means, in which the information supplied over the typewriter keyboard is stored and which controls the printing mechanism of the typewriter as required in accordance therewith.

Text processing arrangements are known in various forms. They are often employed in offices to store text material when the latter is initially recorded on typing paper by means of typewriters, whereby it is possible to produce additional copies by actuation of the printing mechanism of the typewriter by means of the stored material without requiring manual insertion of the text. In particular, it is desirable that text processing arrangement be designed to make possible the revision and correction of the original content of the stored text material by employment of appropriate operations. By effecting the corrections in this manner manual retyping of documents, already initially manually typed, is greatly reduced, and at the same time a potential source of new errors is eliminated.

However, a number of difficulties remain in the known arrangements in that to make corrections and to insert or delete portions of text, the corresponding locations in the storage medium have to be found by a reference to the edited typed document. To accomplish this, the location of the material involved must be located on the document by counting the paragraphs, the lines and the words within the line, which information is then fed into the machine. Automatic line numbering, which otherwise may be more of a nuisance, does simplify this procedure, but does not provide a completely satisfactory solution to the problem.

BRIEF SUMMARY OF THE INVENTION

The primary object of the present invention is the production of a text processing arrangement which may employ a typewriter mechanism which, on the one hand, can be operated in the same manner as a simple office typewriter, only needing a few additional control functions, and which, on the other hand, permits revision of pages of text already typed through a simple comparison of the stored text with the typed master document.

A text processing arrangement which meets the desired requirements, employs, in accordance with the invention, two storage devices each having sufficient capacity to retain the information content of a typewritten page, in conjunction with associated selection means for example, respective selection units, a panel structure receiving and displaying a typewritten page and provided with an optical indicator which is capable of synchronization, character by character and line by line, with the read-out of the storage devices. Switching means is also provided for selectively coupling the keyboard, storage devices, indicator panel and printing mechanism, whereby the textural information supplied over the keyboard is simultaneously stored in a first storage device, under the control of a first selection unit, and recorded by the printing mechanism on a suitable sheet or page, whereby, in the event of correction of the textual information already recorded, those portions of the initial document which are to remain unchanged, are transferred from the first storage device to the second storage device, and simultaneously therewith re-recorded on a new sheet or page, while an optical indicator on the panel follows the read-out of the information from the first storage device and indicates the instant location of such read-out on the initially typewritten page disposed upon the panel.

By means of the text processing arrangement constructed in accordance with the invention, a clear and readily recognizable link is established between the stored information and the initially typed document containing the same information, which is achieved without the requirement of the document or the typing unit requiring the monitoring of any additional line numbering. In use, prior to commencement of the transfer, the initial page of copy is disposed on the panel with the optical indicator set in the starting position of the text information on the initially typed page. Thereafter, the optical indicator will accurately follow and indicate the instant read-out information.

In accordance with a further improvement of the invention, the relationship of the two selection units with respect to the two storage units can be changed by means of suitable switching elements, which preferably are actuated by switching signals from the indicating panel. As a result, with each request for the repetition of selected material, the storage unit containing the information recorded on the initial document is automatically switched to the selection unit seeking the stored information, and if necessary supply it to the printing mechanism as well as to the second storage device. In a further embodiment of the text processing arrangement according to the invention, the individual storage units are interchangeable. In this manner, the stored information can be obtained in parallel with the described typwritten sheet on a page basis, and is available for subsequent interrogation and the text processing arrangement in parallel with a manually revised typewritten page.

In accordance with a preferred embodiment of the invention, a switching unit is provided between a selection unit demanding information from one of the storage devices, and the printing mechanism, and the second selection unit conducting the new information to the second storage device and, in addition, a switching unit is provided for deleting and/or inserting code combination characters depending on a control signal that can be supplied over manual control switches. Such automatic insertion and/or deletion unit is operable, in particular for the insertion in the text or removal therefrom, orders relating to lines of demarcation, line advance and carriage return, when as a result of insertions, the line structure in the new text differs from that of the initial document. It is known to consolidate orders such as "line advance" and "carriage return" into a single common order "new line".

In accordance with a further embodiment of the invention, there is disposed between the selection unit calling for information from one of the storage devices and the printing mechanism, and the second selection unit effecting storage of the new information in the other storage device, a switching unit by means of which the flow of information from one of the storage devices may be interrupted in dependence upon the actuation of a manual control switch. With this arrangement it is thereby possible to call for information from a first storage device without transferring such information to the second storage device and the printing mechanism, whereby the corresponding information is thereby visibly erased.

Preferably the indicator panel, in accordance with the invention, in addition to the provision of an optical indicating mark moving precisely from character to character along the displayed information, is also provided with means functioning as an indicating mark, which precedes the first mark by a predetermined number of characters with the interval between the two indicating marks designating a zone within which a line may be broken, effecting an interruption of a word, if necessary.

In a further embodiment of the invention, the indicator panel may employ an illuminated rule which is movable from line to line and is provided with a light conductor for each character space, with the ends of the light conductors adjacent the illumination source therefor being disposed in a spiral and the illumination source being movably guided therealong. The information thus may be readily indicated in a simple manner on the copy diposed on the panel.

It is also possible, within the scope of the invention, to employ indicator panels in which the displayed text is indicated, character by character, by means of a deflectable beam of light disposed above the typed document or by means of a mechanical indicator.

BRIEF DESCRIPTION OF THE DRAWINGS

In the drawings wherein like reference characters indicate like or corresponding parts.

DETAILED DESCRIPTION OF THE INVENTION

Figure 1:
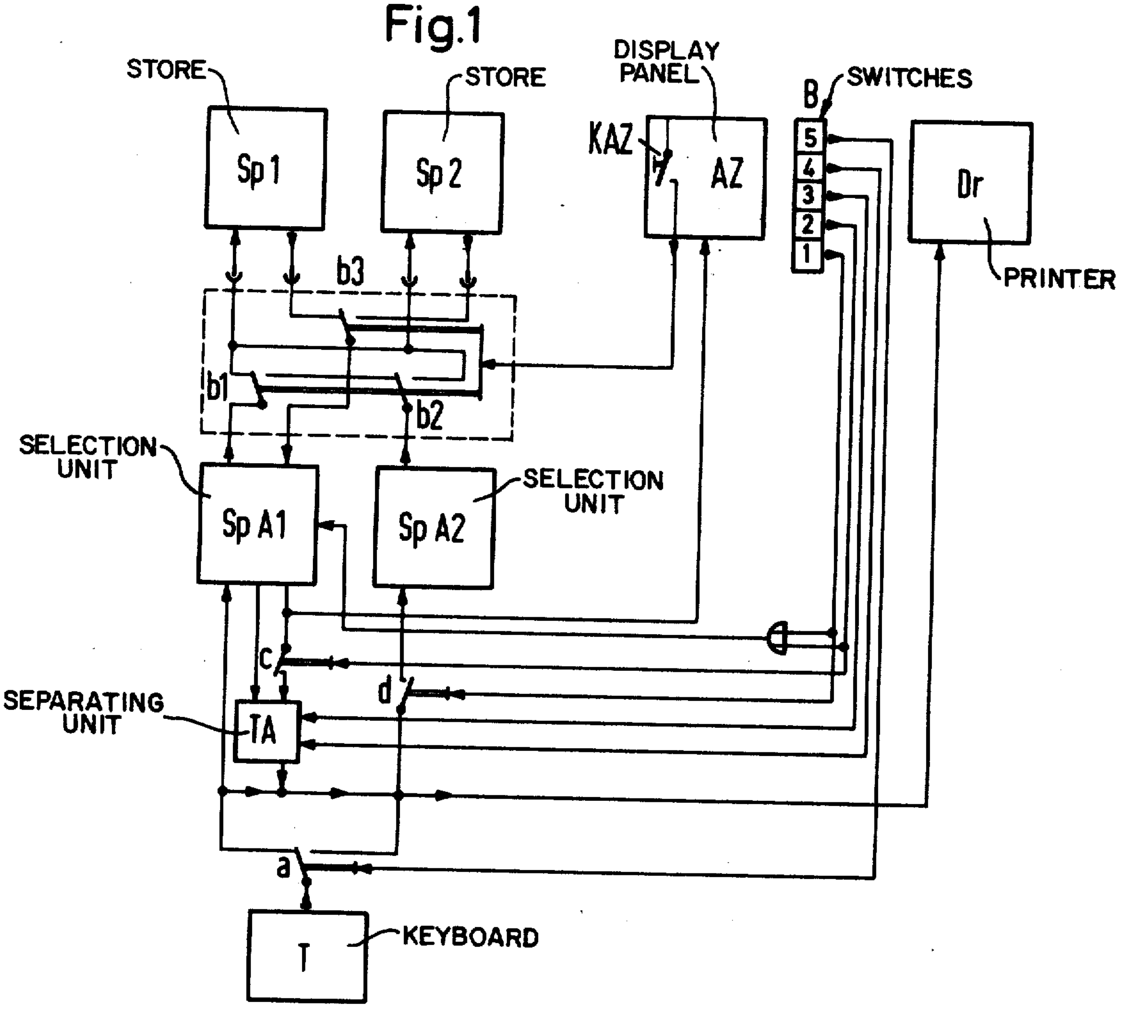
FIG. 1 is a block circuit diagram of a text processing arrangement in accordance with the invention.

Referring to the drawings and more particularly to FIG. 1, respective storage devices or stores Sp1, Sp2 are adapted to be controlled by corresponding selection units SpA1 and SpA2 with a keyboard T being provided for formation of the text material which is to be typed or printed in a corresponding mechanism Dr. An indicator panel AZ is provided for reception of a page of initially prepared text material which is to be corrected, by the addition or deletion of material therefrom, and retyped by the printing unit Dr. A selector console B is provided having a plurality of push button switches 1–5 cooperable with the selection units and keyboard, as well as with an automatic separating unit TA, by means of which various operations of the arrangement can be controlled. It will be appreciated that the circuit illustrated is in simplified form and if deemed necessary or desirable, where components are connected in parallel, additional isolation gates or other suitable means may be included to provide desired conduction paths.

For normal or initial typing operations, by suitable disposition of the switches a, b1, b2 and b3 in the positions illustrated, information derived from the keyboard T may be printed on a sheet of typing paper in the mechanism Dr. Simultaneously therewith, such information is supplied by the store selection unit SpA1, to the store Sp1 in which it is thereby stored.

If this information is to be subsequently rewritten in revised form, the page of material, initially printed by the mechanism Dr, is disposed on the indicator panel AZ with the indicating mark of the panel set to coincide with the beginning of the text. By manually actuating the push button switch B1 on the operating console B, the information contained in the store Sp1 is read-out, character by character, over the store selection unit SpA1 from which it is conducted to the automatic separating unit TA, and therefrom to the mechanism Dr for printing thereat, and, over the second selection unit SpA2, stored in the second store Sp2.

If a portion of the information read-out from the store Sp1, over store selection unit SpA1, is to be erased, i.e. not supplied to the printing mechanism Dr and stored in the second store Sp2, the button contact B2 on the operating console B is actuated to open contact c during the read-out of the information from the store Sp1 over the store selection unit SpA1, with the result that the flow of information being read-out is not passed on to the printing mechanism.

The push button switches B3 and B4, as hereinafter described in greater detail with reference to FIG. 2, select the mode of operation of the automatic separating unit TA with respect to the control of the printing unit Dr. If a new correction text is to be added to the information, the push button switch B5 on the console B is actuated whereby contact is switched over and insertion is effected by means of the keyboard T for printing in the unit Dr and storage of the information in the store Sp2.

The indicating mark of the indicator panel is controlled by the stream of data read-out of the store selection unit SpA1, i.e. is correspondingly moved in forward or backward direction by each piece of information involving a switching step, and thus follows and indicates on the initial or master document, disposed on the indicating panel, the read-out operation in the store Sp1 and the correspondence thereof with respect to the master copy.

In utilization of an edited version as a new master document for revision, the corresponding typewritten page is placed on the indicating panel AZ and the indicating means properly set at the beginning of the text material. Upon such placing of the typwritten page on the indicating panel, a contact KAZ is thereby actuated to provide a control command operative to effect a switching over of contacts b1, b2 and b3 whereby the corresponding information contained in the store Sp2 is now accessible to the store selection unit SpA1 calling therefor. In like manner, the store Sp1 is operative to receive the newly edited text material over the store selection unit SpA2.

If it is anticipated that revision of a typewritten page will take a fairly long time, during which other typing work is to be done, the stores containing the information of one page can be detached by virtue of plug-in connections schematically illustrated, removed and replaced by other storage units.

Figure 2:
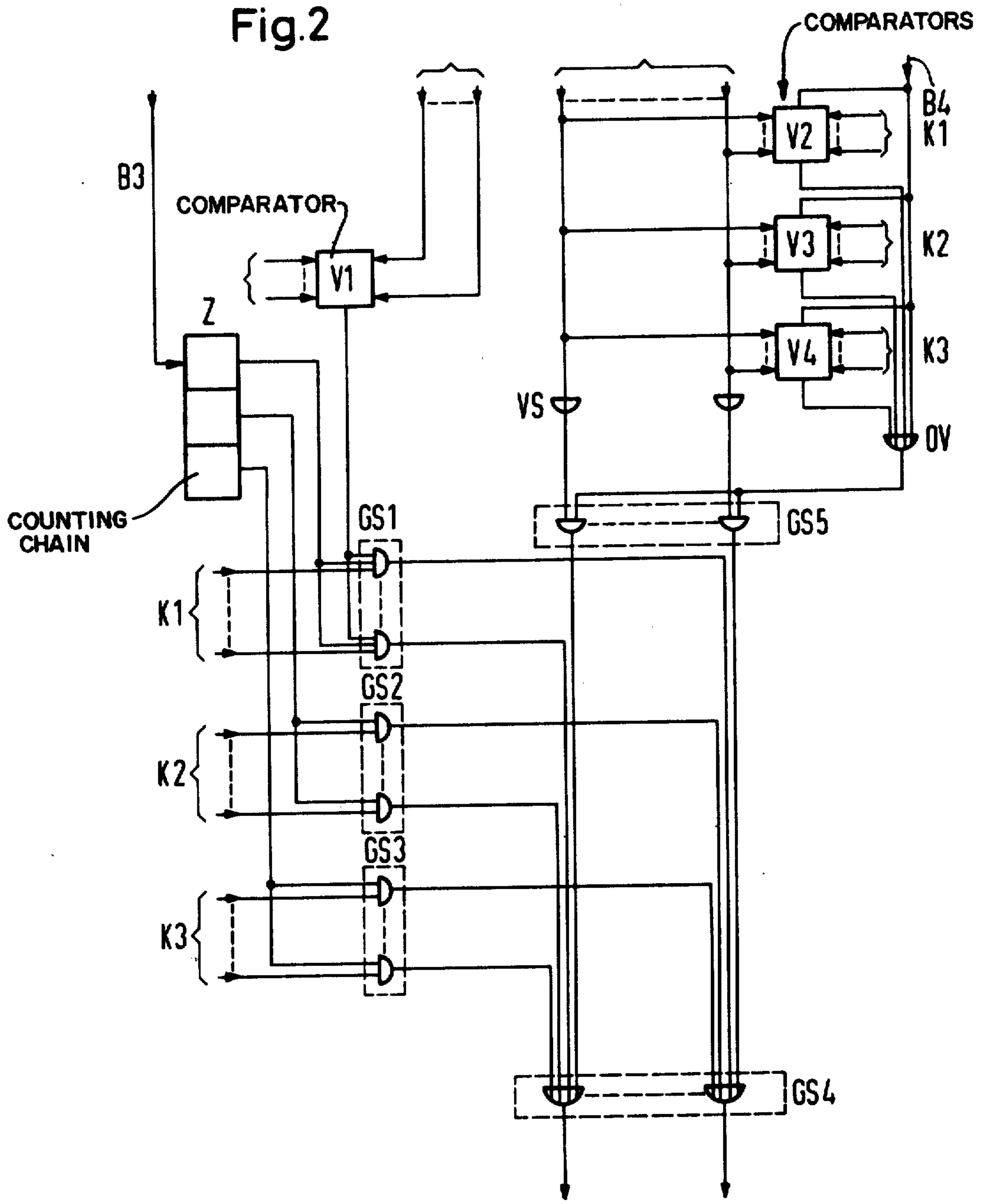
FIG. 2 is a circuit diagram of a switching unit for inserting and deleting certain code combinations in the data flow.

FIG. 2, illustrating in greater detail the circuit arrangement of the automatic separating unit TA shown in FIG. 1, enables the insertion or deletion of line division signals which, due to corrections, differ in the rewritten version from those of the master document, as a result of which line division orders must be supplied at the appropriate points and existing line division orders deleted.

A line division order may be supplied by manually actuating push button switch B3 on the operating console B, with the pulse initiated thereby starting the operation of a counting chain Z, by means of which code combinations K1, K2, K3, may be inserted successively over gate circuits GS1, GS2, GS3, which storage is effected by appropriate wiring of the gate inputs, and are read-out successively and inserted in the stream of information over a further gate circuit GS4. The code combination K1 corresponds to a line of demarcation i.e. a dash, which is to be inserted only when a line is broken within a word. Accordingly, it is established by means of a comparator element V1 whether the character just read-out or to be read-out over the store selection unit SpA1 is actually an open space or gap so that a line of demarcation need not be inserted. In this case, the gate circuit GS1 is not opened and the code combination K1 is not supplied.

The code combinations K2 and K3 reproduce the orders for carriage retraction and line advance. If these orders are combined for organizational purposes into a common code combination, the gate circuit GS3 becomes superfluous and with it the last stage of the counting chain Z.

If a line division exists in the master document which is not to appear in the edited version, puch button B4 on the operating console B is actuated which in turn activates comparators V2, V3 and V4 which monitor the stream of characters leaving the store selection unit SpA1. If code combinations occur for "line of demarcation", "carriage retraction" and "line advance", they are prevented by a gate circuit GS5 from passing one, with delay stage VS equalizing the running times in the comparators V2, V3, V4, and the OR-link OV.

Figure 3:
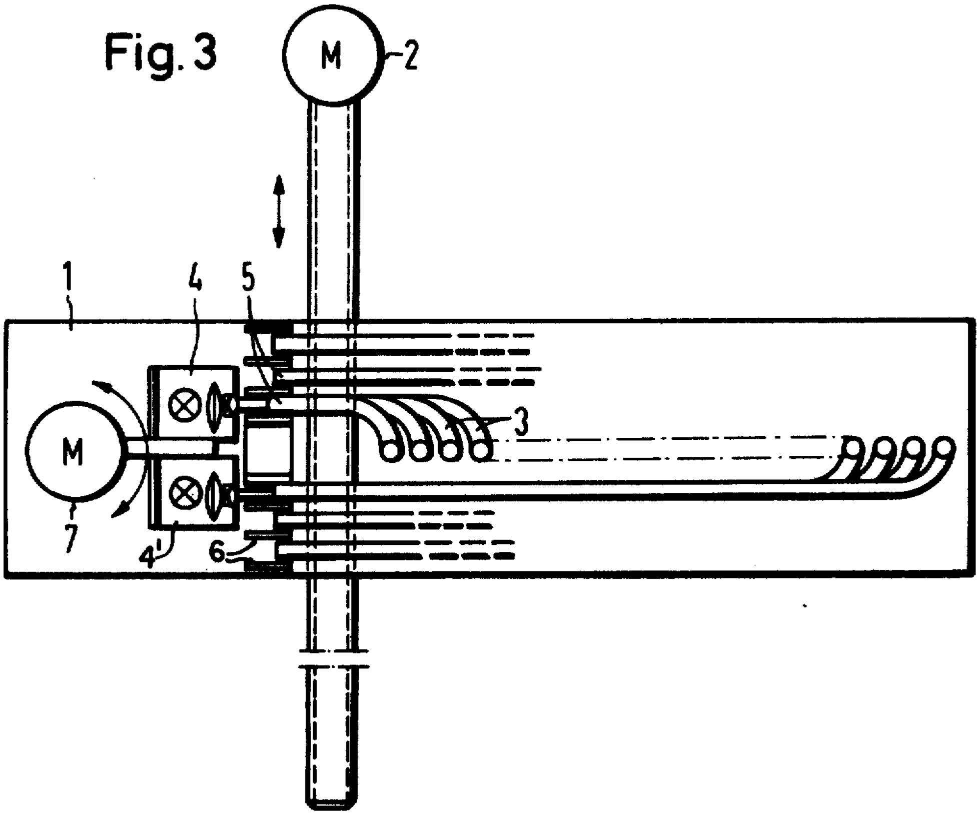
FIG. 3 is a bottom plan view of an illuminated rule utilizing light conductors which may be employed on the indicator panel.
Figure 4:
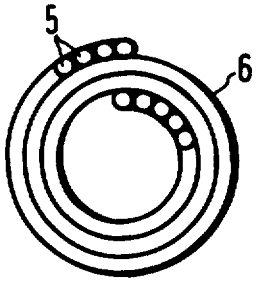
FIG. 4 is an end elevational view of the ends of the light conductors of the rule illustrated in FIG. 3, in the vicinity of the illumination source.

FIGS. 3 and 4 illustrate one form of indicating device for use with the indicating panel AZ. In this construction, an illuminated rule 1, which extends the full length of a line, is moved vertically, as illustrated in FIG. 3 and indicated by the arrows, by means of a motor 2 through a worm drive. A plurality of light conductors 3 each terminate at a respective character space along the line, with the other ends 5 of the light conductors being disposed in a spiral path along a guide track 6 adjacent an illumination source 4 which is movable along the guide track 6 by means of a motor 7, in such manner that the respective recording points for character spaces along the printing path are successively illuminated character by character.

Figure 5:
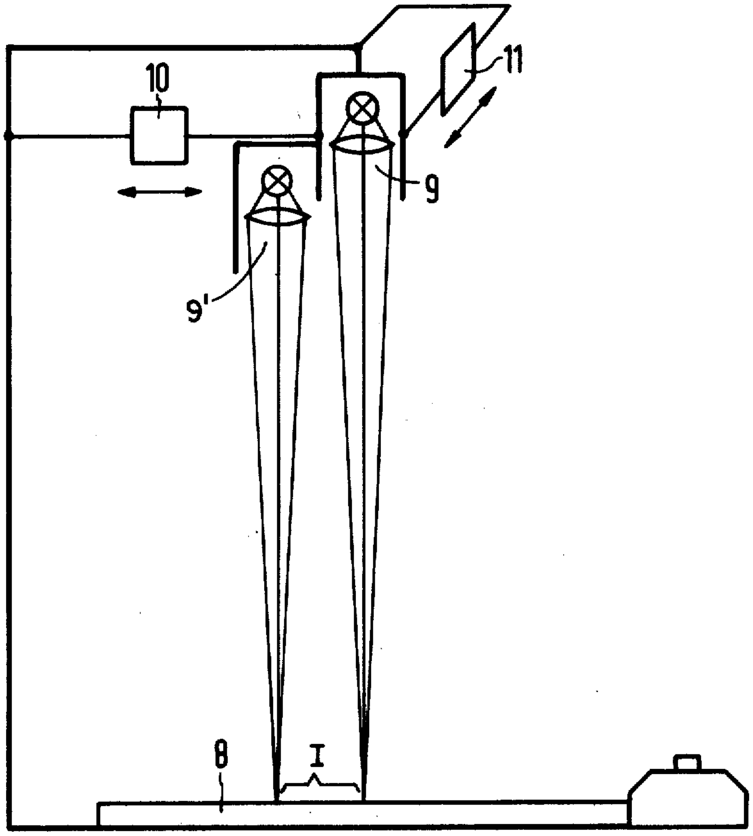
FIG. 5 is a diagrammatic figure of a further indicating device, employing a deflectable beam of light.

FIG. 5 diagrammatically illustrates a modified form of indicating means in which a beam of light is adapted to be moved along the printing line. In this construction, the indicator panel comprises a suitable supporting structure 8 on which the master document is disposed and an overhead illumination source 9 is focused down on the master document with the marking light beam formed thereby being deflected from character to character by means of a motor 10 and from line to line by means of a motor 11, whereby the beam will follow the read-out operation on the master document.

As previously mentioned, it may be desirable to also indicate the interval or zone within which a line of the initial page may be broken, with interruption of a word if necessary.

FIGS. 3 and 5 schematically illustrate this additional feature. In FIG. 3 an additional illumination source 4' is illustrated, which is so arranged that it will follow the illumination source 4 by a predetermined number of character spaces to designate the desired interval. In FIG. 5 an additional illumination source 9' is illustrated, which is so disposed, relative to the source 9, that it will indicate the desired interval, designated by the reference character I.

Figure 6:
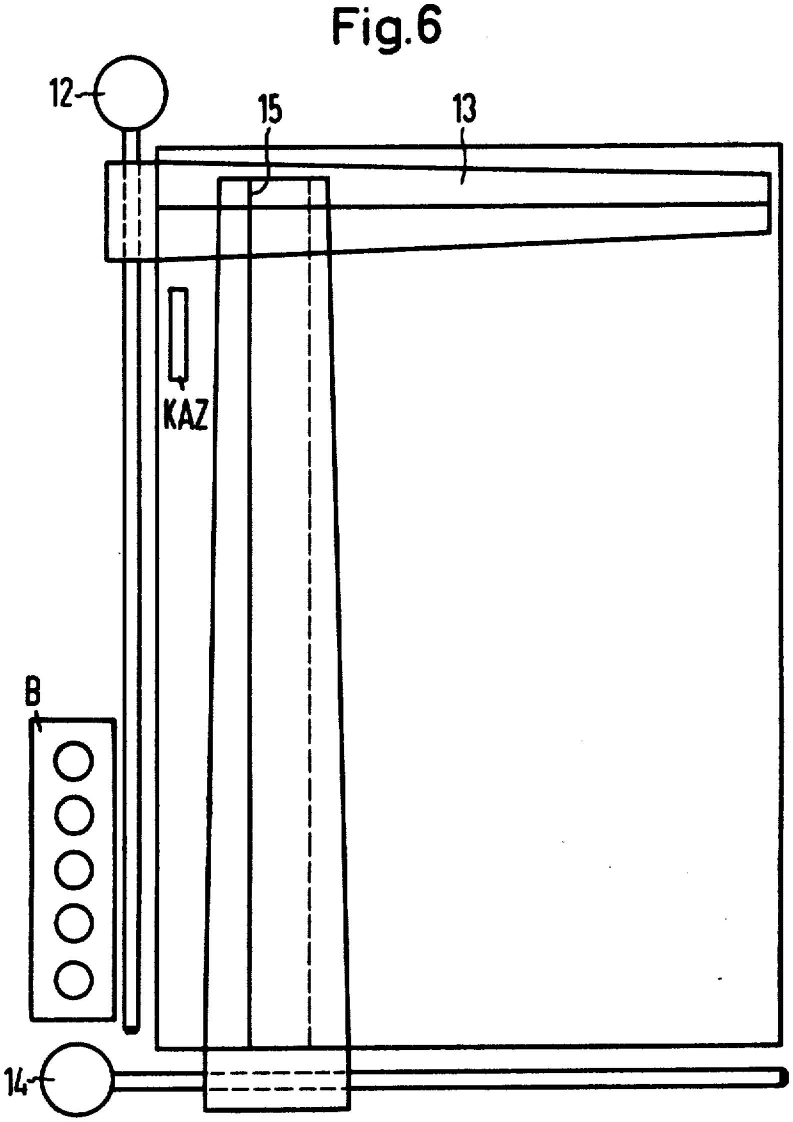
FIG. 6 is a diagrammatic figure of a further panel structure employing mechanically actuated indicating means.

FIG. 6 illustrates a mechanical indicating mechanism in which the indicating panel is provided with a transparent line rule 13, adjustable from line to line by a motor 12 and a transparent column rule 15 adjustable from character to character within the lines by a further motor 14. The critical point in the stream of information at any time is thus designated by the point of intersection of the index lines of the respective transparent rules 13, 15.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A text processing arrangement employing a typewriter in conjunction with a storage device, in which information fed in over the typwriter keyboard can be stored and which stored information controls the printing mechanism of the typewriter in accordance therewith, the combination of a keyboard unit, a printing unit, two storage devices, each having an input, an output, and a capacity to contain the information content of a typewritten page, a corresponding selection unit for each storage device, an indicating panel structure constructed to receive and display a typewritten page, and having optical indicator means cooperable therewith, synchronizable character by character and line by line with the information flow from either storage device, to designate the location on such a page of the last supplied character, and switching means for selectively coupling said keyboard unit, printing unit, storage devices, corresponding selection units, and indicating panel, whereby, in a first switching combination information from said keyboard is simultaneously supplied to said printing unit, for printing thereby, and to one of said storage devices for storage therein, and in a second combination in the event of correction of stored textural information, information to remain unchanged is supplied from said first-mentioned storage device to said printing unit for printing thereby, and to the other of said storage devices for storage therein, and operatively connecting said optical indicating means to the storage device being read out, whereby said indicator means will follow the re-recording of such unchanged information on the initially recorded typewritten page, disposed on said indicating panel and further optical indicator means for designating a location which precedes the character designated by said first-mentioned indicator means by a predetermined number of character spaces, with the interval between the two characters so designated defining a zone within which a line may be broken, with interruption of a word if necessary.

2. A text processing arrangement employing a typewriter in conjunction with a storage device, in which information fed in over the typewriter keyboard can be stored and which stored information controls the printing mechanism of the typewriter in accordance therewith, the combination of a keyboard unit, a printing unit, two storage devices, each having an input, an output, and a capacity to contain the information content of a typewritten page, a corresponding selection unit for each storage device, and indicating panel structure constructed to receive and display a typwritten page, and having optical indicator means cooperable therewith, synchronizable character by character and line by line with the information flow from either storage device, to designate the location on such a page of the last supplied character, said optical indicator means comprising a rule adapted to extend transversely below a page, disposed on said panel, and movable from line to line, said rule carrying a plurality of light conductors, each having its light discharge end disposed at a respective character space for illuminating the same, the light-receiving ends thereof being arranged in a spiral, an illumination device for said supplying light to said light conductors, and means for guiding said illumination device along said spiral path, and switching means for selectively coupling said keyboard unit, printing unit, storage devices, corresponding selection units, and indicating panel, whereby, in a first switching combination information from said keyboard is simultaneously supplied to said printing unit, for printing thereby, and to one of said storage devices for storage therein, and in a second combination in the event of correction of stored textural information, information to remain unchanged is supplied from said first-mentioned storage device to said printing unit for printing thereby, and to the other of said storage devices for storage therein, and operatively connecting said optical indicating means to the storage device being read out, whereby said indicator means will follow the re-recording of such unchanged information on the initially recorded typewritten page, disposed on said indicating panel.

3. A text processing arrangement employing a typewriter in conjunction with a storage device, in which information fed in over the typewriter keyboard can be stored and which stored information controls the printing mechanism of the typewriter in accordance therewith, the combination of a keyboard unit, a printing unit, two storage devices, each having an input, an output, and a capacity to contain the information content of a typewritten page, a corresponding selection unit for each storage device, an indicating panel structure constructed to receive and display a typewritten page, and having optical indicator means cooperable therewith, synchronizable character by character and line by line with the information flow from either storage device, to designate the location on such a page of the last supplied character, said optical indicator means comprising an illumination device disposed above said panel, operative to illuminate the desired character space, and means for moving said illumination device in coordinate directions to direct the light beam therefrom from line to line and character to character on a page disposed on said panel, and switching means for selectively coupling said keyboard unit, printing unit, storage devices, corresponding selection units, and indicating panel, whereby, in a first switching combination information from said keyboard is simultaneously supplied to said printing unit, for printing thereby, and to one of said storage devices for storage therein, and in a second combination in the event of correction of stored textural information, information to remain unchanged is supplied from said firstmentioned storage device to said printing unit for printing thereby, and to the other of said storage devices for storage therein, and operatively connecting said optical indicating means to the storage device being read out, whereby said indicator means will follow the re-recording of such unchanged information on the initially recorded typewritten page, disposed on said indicating panel.

4. A text processing arrangement employing a typewriter in conjunction with a storage device, in which information fed in over the typewriter keyboard can be stored and which stored information controls the printing mechanism of the typewriter in accordance therewith, the combination of a keyboard unit, a printing unit, two storage devices, each having an input, an output, and a capacity to contain the information content of a typewritten page, a corresponding selection unit for each storage device, an indicating panel structure constructed to receive and display a typewritten page, and having optical indicator means cooperable therewith, synchronizable character by character and line by line with the information flow from either storage device, to designate the location on such a page of the last supplied character, said optical indicator means comprises a pair of elongated rules, disposed at right angles to one another, for respectively designating lines and characters respectively, means for moving the line rule from line to line and the column rule from character to character, said rules each having an index line thereon with the intersection of said index lines designating the desired character, and switching means for selectively coupling said keyboard unit, printing unit, storage devices, corresponding selection units, and indicating panel, whereby, in a first switching combination information from said keyboard is simultaneously supplied to said printing unit, for printing thereby, and to one of said storage devices for storage therein, and in a second combination in the event of correction of stored textural information, information to remain unchanged is supplied from said first-mentioned storage device to said printing unit for printing thereby, and to the other of said storage devices for storage therein, and operatively connecting said optical indicating means to the storage device being read out, whereby said indicator means will follow the re-recording of such unchanged information on the initially recorded typewritten page, disposed on said indicating panel.

5. A text processing arrangement employing a typewriter in conjunction with a storage device, in which information fed in over the typewriter keyboard can be stored and which stored information controls the printing mechanism of the typewriter in accordance therewith, the combination of a keyboard unit, a printing unit, two storage devices, each having an input, an output, and a capacity to contain the information content of a typewritten page, a corresponding selection unit for each storage device, an indicating panel structure constructed to receive and display a typewritten page, and having optical indicator means cooperable therewith, synchronizable character by character and line by line with the information flow from either storage device, to designate the location on such a page of the last supplied character, further optical indicator means for designating a location which precedes the character designated by said firstmentioned indicator means by a predetermined number of character spaces, with the interval between the two characters so designated defining a zone within which a line may be broken, with interruption of a word if necessary, and switching means for selectively coupling said keyboard unit, printing unit, storage devices, corresponding selection units, and indicating panel, whereby, in a first switching combination information from said keyboard is simultaneously supplied to said printing unit, for printing thereby, and to one of said storage devices for storage therein, and in a second combination in the event of correction of stored textural information, information to remain unchanged is supplied from said first-mentioned storage device to said printing unit for printing thereby, and to the other of said storage devices for storage therein, and operatively connecting said optical indicating means to the storage device being read out, whereby said indicator means will follow the re-recording of such unchanged information on the initially recorded typewritten page, disposed on said indicating panel, said switching means including plug-in connections, by means of which the individual storage devices are interchangeable, said indicator panel including means for producing control signals which operatively control said switching elements and thereby the relationship of said stores and said selection units, further switching means, including switching elements operatively disposed between the selection unit adapted to supply information, from one of said stores, to the printing mechanism and to the other selection unit adapted to supply new information to the other store, for inserting code combination characters into the stream of such information, said further switching means also including switching elements operatively disposed between the selection unit adapted to supply information, from one of said stores, to the printing mechanism and to the other selection unit adapted to supply new information to the other store, for deleting code combination characters from the stream of such information, said further switching means also including switching elements operatively disposed between the selection unit adapted to supply information, from one of said stores, to the printing mechanism and to the other selection unit adapted to supply new information to the other store, for interrupting the flow of information from said first selection unit to the printing mechanism and the other selection unit for effecting an erasure thereof, and manually actuatable means for supplying signals to the respective switching elements of such further switching means for controlling respectively such deletion, insertion and erasure.

6. A text processing arrangement employing a typewriter in conjunction with a storage device, in which information fed in over the typewriter keyboard can be stored and which stored information controls the printing mechanism of the typewriter in accordance therewith, the combination of a keyboard unit, a printing unit, two storage devices, each having an input, an output, and a capacity to contain the information content of a typewritten page, a corresponding selection unit for each storage device, an indicating panel structure constructed to receive and display a typewritten page, and having optical indicator means cooperable therewith, synchronizable character by character and line by line with the information flow from either storage device, to designate the location on such a page of the last supplied character, said optical indicator means comprising a rule adapted to extend transversely below a page, disposed on said panel, and movable from line to line, said rule carrying a plurality of light conductors, each having its light discharge end disposed at a respective character space for illuminating the same, the light-receiving ends thereof being arranged in a spiral, an illumination device for said supplying light to said light conductors, and means for guiding said illumination device along said spiral path, and switching means for selectively coupling said keyboard unit, printing unit, storage devices, corresponding selection units, and indicating panel, whereby, in a first switching combination information from said keyboard is simultaneously supplied to said printing unit, for printing thereby, and to one of said storage devices for storage therein, and in a second combination in the event of correction of stored textural information, information to remain unchanged is supplied from said first-mentioned storage device to said printing unit for printing thereby, and to the other of said storage devices for storage therein, and operatively connecting said optical indicating means to the storage device being read out, whereby said indicator means will follow the re-recording of such unchanged information on the initially recorded typewritten page, disposed on said indicating panel, said switching means including plug-in connections, by means of which the individual stores are interchangeable, said indicator panel includes means for producing control signals which operatively control said switching elements and thereby the relationship of said stores and said selection units, further switching means, including switching elements operatively disposed between the selection unit adapted to supply information, from one of said stores, to the printing mechanism and to the other selection unit adapted to supply new information to the other store, for inserting code combination characters into the stream of such information, said further switching means also including switching elements operatively disposed between the selection unit adapted to supply information, from one of said stores, to the printing mechanism and to the other selection unit adapted to supply new information to the other store, for deleting code combination characters from the stream of such information, said further switching means also including switching elements operatively disposed between the selection unit adapted to supply information, from one of said stores, to the printing mechanism and to the other selection unit adapted to supply new information to the other store, for interrupting the flow of information from said first selection unit to the printing mechanism and the other selection unit for effecting an erasure thereof, and manually actuatable means for supplying signals to the respective switching elements of such further switching means for controlling respectively such deletion, insertion and erasure.

7. A text processing arrangement employing a typewriter in conjunction with a storage device, in which information fed in over the typewriter keyboard can be stored and which stored information controls the printing mechanism of the typewriter in accordance therewith, the combination of a keyboard unit, a printing unit, two storage devices, each having an input, an output, and a capacity to contain the information content of a typewritten page, a corresponding selection unit for each storage device, an indicating panel structure constructed to receive and display a typewritten page, and having optical indicator means cooperable therwith, synchronizable character by character and line by line with the information flow from either storage device, to designate the location on such a page of the last supplied character, said optical indicator means comprises an illumination device disposed above said panel, operative to illuminate the desired character space, and means for moving said illumination device in coordinate directions to direct the light beam therefrom from line to line and character to character on a page disposed on said panel, and switching means for selectively coupling said keyboard unit, printing unit, storage devices, corresponding selection units, and indicating panel, whereby, in a first switching combination information from said keyboard is simultaneously supplied to said printing unit, for printing thereby, and to one of said storage devices for storage therein, and in a second combination in the event of correction of stored textural information, information to remain unchanged is supplied from said firstmentioned storage device to said printing unit for printing thereby, and to the other of said storage devices for storage therein, and operatively connecting said optical indicating means to the storage device being read out, whereby said indicator means will follow the re-recording of such unchanged information on the initially recorded typewritten page, disposed on said indicating panel, said switching means includes plug-in connections, by means of which the individual stores are interchangeable, said indicator panel includes means for producing control signals which operatively control said switching elements and thereby the relationship of said stores and said selection units, further switching means, including switching elements operatively disposed between the selection unit adapted to supply information, from one of said stores, to the printing mechanism and to the other selection unit adapted to supply new information to the other store, for inserting code combination characters into the stream of such information, said further switching means also including switching elements operatively disposed between the selection unit adapted to supply information, from one of said stores, to the printing mechanism and to the other selection unit adapted to supply new information to the other store, for deleting code combination characters from the stream of such information, said further switching means also including switching elements operatively disposed between the selection unit adapted to supply information, from one of said stores, to the printing mechanism and to the other selection unit adapted to supply new information to the other store, for interrupting the flow of information from said first selection unit to the printing mechanism and the other selection unit for effecting an erasure thereof, and manually actuable means for supplying signals to the respective switching elements of such further switching means for controlling respectively such deletion, insertion and erasure.

8. A text processing arrangement employing a typewriter in conjunction with a storage device, in which information fed in over the typewriter keyboard can be stored and which stored information controls the printing mechanism of the typewriter in accordance therewith, the combination of a keyboard unit, a printing unit, two storage devices, each having an input, an output, and a capacity to contain the information content of a typewritten page, a corresponding selection unit for each storage device, an indicating panel structure constructed to receive and display a typewritten page, and having optical indicator means cooperable therewith, synchronizable character by character and line by line with the information flow from either storage device, to designate the location on such a page of the last supplied character, said optical indicator means comprising a pair of elongated rules, disposed at right angles to one another, for respectively designating lines and characters respectively, means for moving the line rule from line to line and the column rule from character to character, said rules each having an index line thereon with the intersection of said index lines designating the desired character, and switching means for selectively coupling said keyboard unit, printing unit, storage devices, corresponding selection units, and indicating panel, whereby, in a first switching combination information from said keyboard is simultaneously supplied to said printing unit, for printing thereby, and to one of said storage devices for storage therein, and in a second combination in the event of correction of stored textural information, information to remain unchanged is supplied from said first-mentioned storage device to said printing unit for printing thereby, and to the other of said storage devices for storage therein, and operatively connecting said optical indicating means to the storage device being read out, whereby said indicator means will follow the re-recording of such unchanged information on the initially recorded typewritten page, disposed on said indicating panel, said switching means includes plug-in connections, by means of which the individual stores are interchangeable, said indicator panel includes means for producing control signals which operatively control said switching elements and thereby the relationship of said stores and said selection units, further switching means, including switching elements operatively disposed between the selection unit adapted to supply information, from one of said stores, to the printing mechanism and to the other selection unit adapted to supply new information to the other store, for inserting code combination characters into the stream of such information, said further switching means also including switching elements operatively disposed between the selection unit adapted to supply information, from one of said stores, to the printing mechanism and to the other selection unit adapted to supply new information to the other store, for deleting code combination characters from the stream of such information, said further switching means also including switching elements operatively disposed between the selection unit adapted to supply information, from one of said stores, to the printing mechanism and to the other selection unit adapted to supply new information to the other store, for interrupting the flow of information from said first selection unit to the printing mechanism and the other selection unit for effecting an erasure thereof, and manually actuatable means for supplying signals to the respective switching elements of such further switching means for controlling respectively such deletion, insertion and erasure.

* * * * *